United States Patent [19]
Husak

[11] Patent Number: 6,157,647
[45] Date of Patent: *Dec. 5, 2000

[54] DIRECT ADDRESSING BETWEEN VLAN SUBNETS

[75] Inventor: David J. Husak, Windam, N.H.

[73] Assignee: 3COM Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,920

[22] Filed: Nov. 6, 1996

[51] Int. Cl.[7] .................................................. H04L 12/28
[52] U.S. Cl. ........................................... 370/401; 370/392
[58] Field of Search .................................... 370/401, 402, 370/404, 406, 408, 392–394, 257, 258, 256, 397, 399

[56] References Cited

U.S. PATENT DOCUMENTS

| | | | |
|---|---|---|---|
| 4,570,217 | 2/1986 | Allen et al. | 364/188 |
| 4,665,500 | 5/1987 | Poland | 364/760 |
| 4,823,338 | 4/1989 | Chan et al. | 370/85 |
| 5,016,162 | 5/1991 | Epstein et al. | 364/200 |
| 5,075,884 | 12/1991 | Sherman et al. | 395/650 |
| 5,208,811 | 5/1993 | Kashio et al. | 370/94.1 |
| 5,214,646 | 5/1993 | Yacoby | 370/85.14 |
| 5,301,270 | 4/1994 | Steinberg et al. | 395/161 |
| 5,361,256 | 11/1994 | Doeringer et al. | 370/401 |
| 5,394,402 | 2/1995 | Ross | 370/402 |
| 5,412,654 | 5/1995 | Perkins | 370/312 |
| 5,442,630 | 8/1995 | Gagliardi et al. | 370/402 |
| 5,444,702 | 8/1995 | Burnett et al. | 370/60.1 |
| 5,444,703 | 8/1995 | Gagliardi et al. | 370/60.1 |
| 5,453,980 | 9/1995 | Van Engelshoven | 370/60.1 |
| 5,479,407 | 12/1995 | Ko et al. | 370/94.1 |
| 5,485,455 | 1/1996 | Dobbins et al. | 370/60 |
| 5,491,694 | 2/1996 | Oliver et al. | 370/85.4 |
| 5,521,597 | 5/1996 | Dimitri | 341/51 |
| 5,521,910 | 5/1996 | Matthews | 370/54 |
| 5,550,816 | 8/1996 | Hardwick et al. | 370/60 |
| 5,583,862 | 12/1996 | Callon | 370/402 |
| 5,684,800 | 11/1997 | Dobbins et al. | 370/401 |
| 5,742,604 | 4/1998 | Edsall et al. | 370/401 |
| 5,802,047 | 9/1998 | Kinoshita | 370/402 |
| 5,959,990 | 9/1999 | Frantz | 370/401 |
| 6,035,105 | 3/2000 | McCloghrie | 370/402 |
| 6,058,429 | 5/2000 | Ames | 370/399 |

*Primary Examiner*—Chi H. Pham
*Assistant Examiner*—Steven Nguyen
*Attorney, Agent, or Firm*—Weingarten, Schurgin, Gagnebin & Hayes LLP

[57] ABSTRACT

A technique for more directly transmitting information between devices in different virtual local area networks ("VLANs") in a local area network ("LAN") is disclosed. A VLAN tag is used to forward a packet into the VLAN in which the destination device resides by attaching the VLAN tag associated with the destination device to each transmission. Devices that are not associated with the VLAN specified by the VLAN tag are thereby segregated from the packet and LAN background traffic overhead is reduced. To determine the appropriate VLAN tag the sending device transmits a NHRP query requesting connectivity information between the sender and receiver, and the receiver or an intermediary router responds with information including the VLAN tag of the receiver. Packets of data are then sent from the sending device to the receiving device with the VLAN tag of the receiver attached thereto so that a more direct connection is established with bridge hops replacing router hops.

35 Claims, 3 Drawing Sheets

DIRECT ADDRESSING BETWEEN VLAN SUBNETS

BACKGROUND OF THE INVENTION

Local area networks ("LANs") are widely used for electronic communication between computerized user devices. One problem which has been recognized with LANs is a tendency for background communication traffic, which user devices must process, to slow the user devices and thereby adversely affect productivity. Accordingly, it is desirable to reduce the background traffic processing overhead.

One way in which background traffic processing overhead is reduced is through the use of virtual LANs ("VLANs"). In the VLAN model a LAN is divided into multiple VLANs, each of which is made up of user devices which share some common trait. For example, a VLAN might include the user devices of a group of workers in a given department if it is assumed that such workers are likely to communicate most frequently amongst themselves. Intra-VLAN Traffic is then segregated to facilitate communication within each VLAN. For example, IEEE Standard 802.1q dictates that a "VLAN tag" be used to identify the VLAN from which a packet of data is transmitted. The VLAN tag is then used to filter packets. Consequently, user devices which are not associated with the VLAN indicated by the VLAN tag need not be slowed by intensive processing to determine whether such packets are destined for such user devices.

While VLAN identification tagging reduces overall traffic overhead, inter-VLAN communication remains problematic. Typically, all inter-VLAN communication is mediated by routers which maintain connectivity tables that indicate the location of various VLANs within the LAN. In a large enterprise LAN there may be multiple router hops between VLANs. This is undesirable because routers are relatively slow in comparison with other network devices, and hence multiple router hops can introduce significant undesirable delay. Further, inter-VLAN communication may create background traffic overhead. A technique for facilitating inter-VLAN communication which reduces such traffic would therefore be desirable.

SUMMARY OF THE INVENTION

In accordance with the present invention a virtual local area network ("VLAN") identification tag is used for directing data transmission between different VLANs in a LAN. More particularly, the VLAN tag is used to indicate the destination of the data packet rather than the source. A local area network ("LAN") includes a plurality of inter-connected VLANs and at least one router which maintains connectivity tables. Each VLAN includes a plurality of inter-connected user devices. In order to transmit a packet from a first user device in a first VLAN to a second user device in a second VLAN the first user device attaches the VLAN tag of the second VLAN to the packet.

The VLAN tag of the second VLAN may be determined by initially transmitting a query from the first user device to the router that requests connectivity information. The query may also be forwarded to the second user device. In response, either the router, the second user device or another intermediate device determines whether the first and second user devices are located on the same LAN and, if so, replies with the address and VLAN tag of the second VLAN. The VLAN tag of the second VLAN is then used to transmit the packet directly from the first user device to the VLAN of the second user device, resulting in directed flooding of the second VLAN.

BRIEF DESCRIPTION OF THE DRAWING

The invention will be more fully understood in view of the following detailed description of the invention and drawing of which.

DETAILED DESCRIPTION OF THE INVENTION

Figure 1:
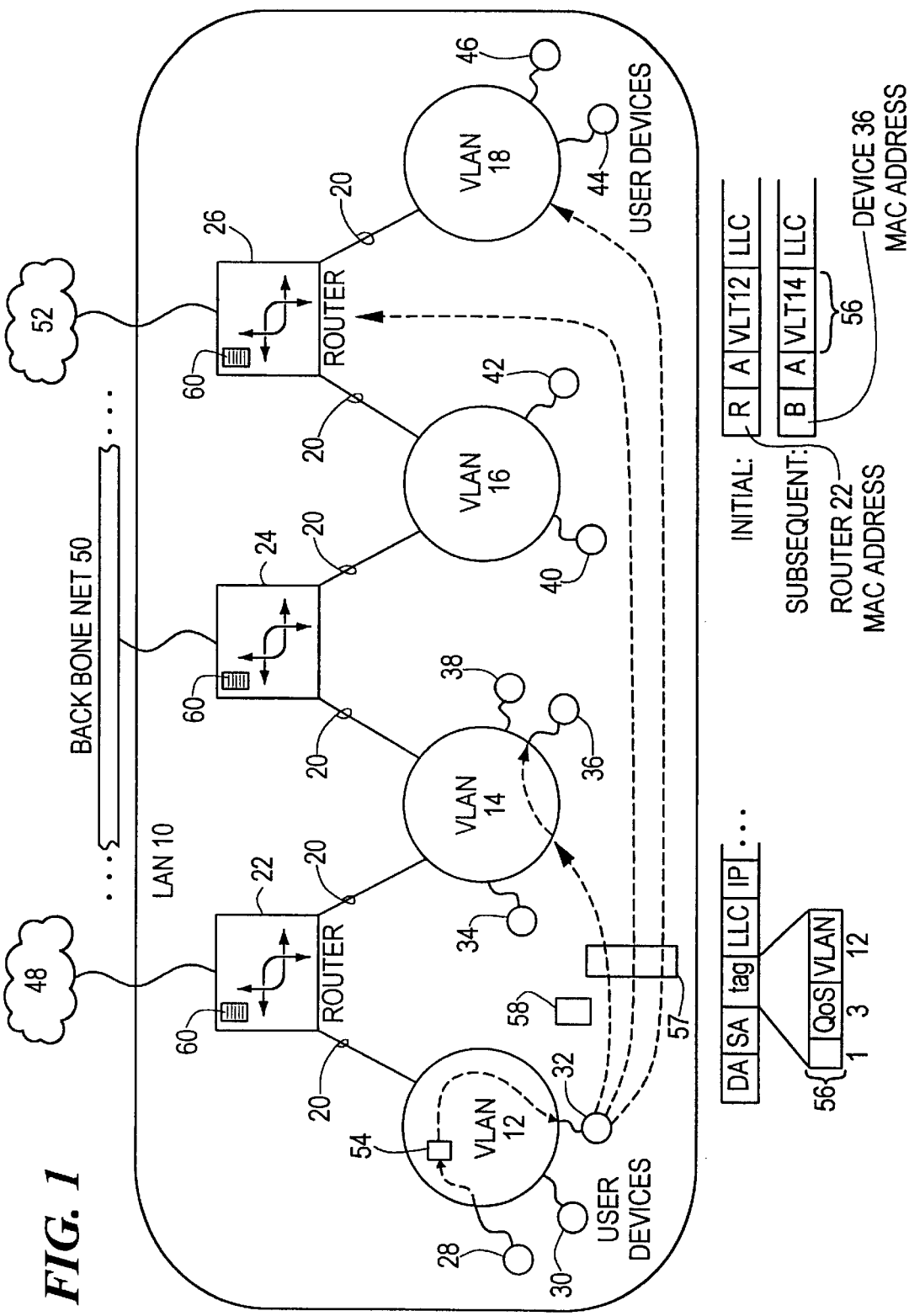
FIG. 1 is a block diagram of a LAN having a plurality of VLANs that are interconnected by routers, and illustrates direct addressing between VLANs.

Referring to FIG. 1, a local area network ("LAN") 10 includes a plurality of virtual LANs ("VLANs") 12, 14, 16, 18 which are interconnected along a path 20 by routers 22, 24, 26. Each VLAN includes a plurality of computer devices 28, 30, 32, 34, 36, 38, 40, 42, 44, 46 (sometimes referred to as "hosts"), such as workstations. The VLANs are connected to computer networks 48, 50, 52 outside of the LAN 10 through the routers 22, 24, 26, respectively, which serve as gateways.

Figure 2:
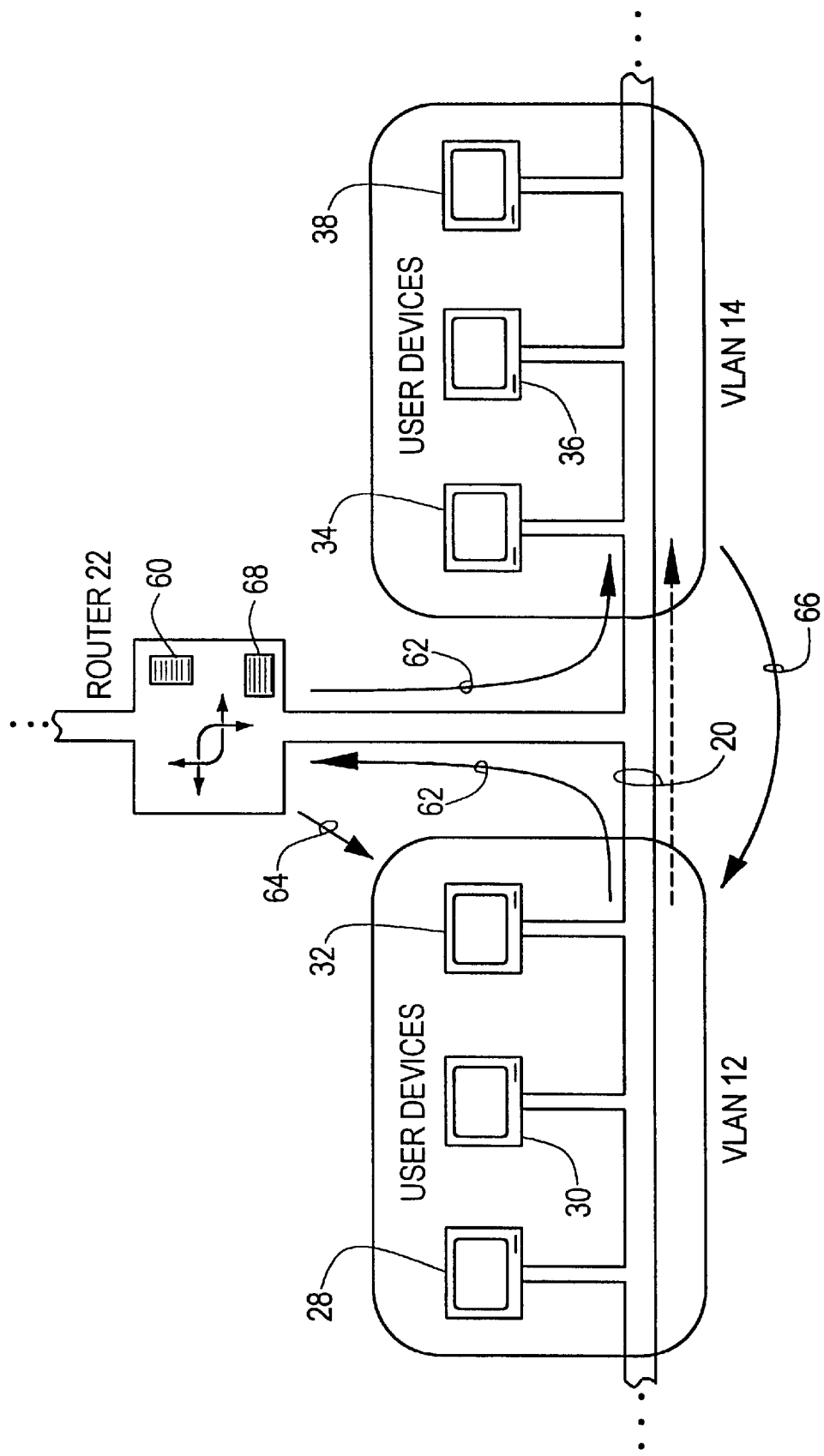
FIG. 2 is a block diagram showing two of the VLANs of FIG. 1 and illustrating direct addressing in greater detail.

Referring now to FIGS. 1 and 2, when a packet of data 54 is transmitted from a first device 28 to a second device 32 located in a single VLAN 12 it is desirable to segregate the packet to minimize background traffic overhead within the LAN 10 as a result of undesired flooding of the packet within the LAN 10. To segregate the packet 54 a VLAN tag 56 is attached to the packet. The VLAN tag indicates both the source and destination of the packet, i.e., VLAN 12. The tag 56 is sixteen bits in length, as specified by IEEE Standard 802.1q, and includes three Quality of Service ("QoS") bits and twelve VLAN tag bits. When the packet is transmitted on the path which interconnects the devices, intermediate devices such as switches (sometimes referred to as "bridges") process the packet and only flood the packet on the designated destination VLAN such that only those devices superimposed on the VLAN specified by the VLAN tag are burdened with processing the packet to determine whether they are an intended recipient of the packet. Non-recipient devices in undesignated VLANs easily filter the packet based upon the VLAN tag. Hence, background traffic overhead in the LAN as a whole is reduced.

When a packet 58 is transmitted between devices which do not reside in the same VLAN, the VLAN tag 56 is used, such as by intermediate devices 57, to direct the packet to the destination VLAN, i.e., to selectively flood the destination VLAN. For example, when sending a packet from device 32 to device 36 the VLAN tag of destination VLAN 14 is employed. When the packet is transmitted on the path which interconnects the devices, only those devices 34, 36, 38 superimposed on the VLAN specified by the VLAN tag, i.e., VLAN 14, need process the packet to determine the intended recipient of the packet. Devices in undesignated VLANs easily filter the packet based upon the VLAN tag. Hence, background traffic overhead in the LAN is further reduced.

Before attaching the VLAN tag of the destination VLAN it is necessary to determine that the transmitting and receiving devices are on the same LAN. It is also necessary to determine the appropriate VLAN tag. The transmitting device typically does not retain sufficient information about the receiving device to determine the VLAN tag. However, the routers maintain detailed connectivity tables 60 with which the packet can be directed from the transmitting device to the receiving device. When multiple routers are interposed between the transmitting and receiving VLANs, the packet may be transmitted from the source device to the router and then redirected from that router to another router, and so on to the destination device by employing the respective router connectivity tables. Hence, the location of the receiving VLAN relative to the location of the transmitting VLAN and the destination VLAN tag are determined by utilizing the routers.

The location of the receiving VLAN relative to the location of the transmitting VLAN may be determined in several different ways, and is employed by the intermediate switching devices which support the VLANs to facilitate transmission. A static configuration may simply be distributed and stored. For a non-static configuration, VLAN topology information can be continuously gathered and distributed throughout the LAN. Each device within each VLAN periodically broadcasts an identification message which includes VLAN membership information. This information may then be distributed among the switching devices in the LAN by using a VLAN Information Protocol ("VLIP"). A simple form of VLIP is a variation on the Group Address Registration Protocol ("GARP") in which VLAN tags may be registered rather than Media Access Control ("MAC") group addresses. However, such a protocol is only practical when the underlying LAN has a simple tree topology. Otherwise, a more sophisticated VLIP variation is required.

A resolution protocol such as the Next Hop Resolution Protocol ("NHRP") may be employed to determine the VLAN tag of the receiving device. NHRP is typically used to resolve addresses across subnet boundaries, e.g., to resolve an Internet Protocol ("IP") address to an Asynchronous Transfer Mode ("ATM") address. However, NHRP may also be employed to resolve a network layer protocol address to a MAC address and VLAN tag. An example of resolution using the NHRP will now be described with regard to FIG. 2. To obtain the VLAN tag for transmission from device 32 to device 36 using the NHRP, the transmitting device 32 first sends a packet to the nearest intermediate router 22. Device 32 then sends a NHRP query 62 to the router 22 requesting connectivity information that indicates the location of device 36 in the LAN topology. The router 22 responds with connectivity information 64, provided the router has such information. If the router does not have such information, the query is passed on to the next immediate VLAN 14, where for the present example the query would be received by device 36. In response, device 36 determines that both devices 32, 36 are on the same LAN and transmits the MAC address and VLAN tag of device 36 to device 32 in a response packet 66. Subsequent packets transmitted from device 32 to device 36 are tagged with the VLAN tag of VLAN 14, and router 22 is avoided. The device 32 may send additional NHRP queries to the router 22 on a periodic basis. Further, the router may maintain a cache 68 of such queries and the replies thereto.

Referring again to FIG. 1, the direct addressing technique may be utilized in a similar manner to avoid multiple router hops. For example, routers 22, 24 and 26 may be avoided when transmitting a packet from device 32 in VLAN 12 to device 44 in VLAN 18. To obtain the VLAN tag for transmission from device 32 to device 44 using the NHRP, the transmitting device 32 first sends a packet to the nearest intermediate router 22. Device 32 then sends a NHRP query 62 to the router 22 requesting connectivity information that indicates the location of device 44 in the LAN topology. The router 22 responds with connectivity information 64, provided the router has such information. If the router does not have such information, the query is passed on to the next immediate VLAN 14, and from there to each intervening VLAN and router until such information is available. In the present example it is likely that neither router 22 nor router 24 would have the information about a device on VLAN 18. However, router 26 is directly connected to VLAN 18 and would therefore contain the information. Hence, in response to the query router 26 provides the VLAN tag and MAC address associated with device 44 in a response packet. Subsequent packets transmitted from device 32 to device 44 are then tagged with the VLAN tag of VLAN 18, and routers 22, 24, 26 are avoided.

Direct addressing may also be employed when transmitting from a device within the LAN to a destination outside the LAN, e.g., from device 32 to network 52. The routers provide gateways to destinations outside of the LAN 10. The particular router chosen to act as gateway for a given connection depends upon which destination is specified. More particularly, each router provides a more direct gateway to different destinations, e.g., router 22 to network 48, router 24 to backbone 50, and router 26 to network 52. Hence, if device 32 is to transmit to network 52, which is outside the LAN, the device will preferably do so through router 26, and avoid router 22 and router 24. In such a case, device 32 sends a query to router 22. Router 22 then determines from the connectivity tables contained therein that the query should be forwarded to router 24 and does so. Router 24 forwards the query to router 26 in a similar manner. Upon receiving the query, router 26 responds to device 32 with a response packet and thereafter acts as a direct gateway by receiving packets directly from device 32. Similar direct addressing could be established for packets destined for device 32 from a device in network 52.

Figure 3:
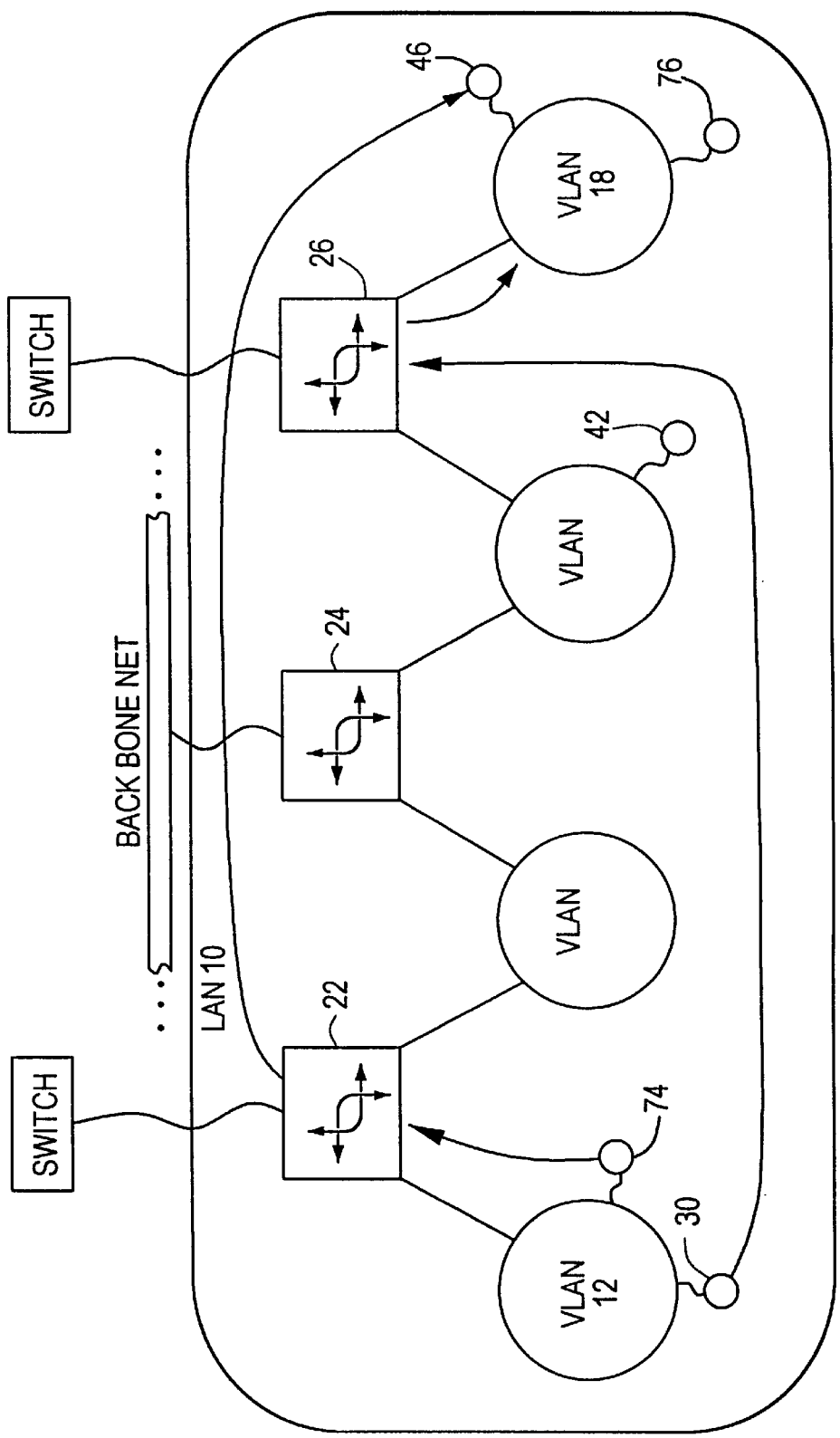
FIG. 3 is a block diagram of the LAN of FIG. 1 further illustrating the technique for direct addressing between VLANs.

Referring now to FIG. 3, it is anticipated that some devices 74, 76 may not be capable of executing the direct transmission technique described above. In such a case, the nearest inter-connecting router is utilized as a proxy to allow the most direct connection possible. For example, to transmit from device 74 in VLAN 12 directly to device 46 in VLAN 18, the packets would be sent from device 74 to router 22, and directly from router 22 to VLAN 18. Alternatively, to transmit from device 30 in VLAN 12 to device 76 in VLAN 18 packets are transmitted from device 30 to router 26, and then from router 26 to VLAN 18. In the case where both devices are unable to execute direct transmission, both respective nearest routers are utilized to shortened the overall path. More particularly, to transmit from device 74 to device 76, packets are transmitted from device 74 to router 22, from router 22 to router 26, and from router 26 to VLAN 18.

Under some circumstances it may be desirable for the router to deny queries based on security concerns. More particularly, routers sometimes function as security implementing devices by filtering transmissions to and from sensitive devices. Such filtering would be avoided by establishment of direct addressing with a sensitive device. Therefore, the router may be preprogrammed to force transmission between a sensitive device and another device to pass through the router by denying the NHRP query.

Having described the preferred embodiments of the invention, it will now become apparent to one of skill in the art that other embodiments incorporating the presently disclosed techniques, apparatus and concepts may be used. Accordingly, the invention should not be limited to the disclosed embodiments, but rather should be viewed as limited only by the spirit and scope of the appended claims.

What is claimed is:

1. A method of transmitting a unit of data from a first device of a plurality of devices in a first virtual local area network to a second device of a plurality of devices in a second, different virtual local area network, where the first virtual local area network is identified by a first virtual local area network tag and the second virtual local area network is identified by a second virtual local area network tag, the method comprising the steps of:

obtaining connectivity information indicating a location of the second device;

determining, responsive to the obtained connectivity information indicating the location of the second device, that the first device and the second device are each included within a common local area network;

determining, responsive to determining that the first device and the second device are each included within the common local area network, that the second device is located on the second, different virtual local area network;

obtaining the second virtual local area network tag in the first device, responsive to determining that the second device is located on the second, different virtual local area network;

addressing the unit of data to the second device by associating the second virtual local area network tag with the unit of data in the first device;

transmitting the unit of data from the first device with the associated second virtual local area network tag;

receiving the unit of data in each device in the second, different virtual local area network; and identifying in the second device that the unit of data is addressed to the second device.

2. The method of claim 1 including the further step of obtaining the second tag from the second device.

3. The method of claim 1 wherein at least one routing device is disposed between the first device and the second device, and including the further step of obtaining the second tag from the at least one routing device.

4. The method of claim 1 including the further step of distributing a description of local area network topology to at least one intermediate device.

5. The method of claim 4 wherein the distributing step includes the further step of employing a virtual local area network information protocol to distribute a description of local area network topology to the intermediate devices.

6. The method of claim 4 wherein the first and second virtual local area networks are disposed in a local area network, and wherein the distributing step includes the further step of registering the VLAN tags of each virtual local area network within the local area network.

7. The method of claim 1 including the further step of determining the second tag by employing a next hop resolution protocol.

8. The method of claim 7 including the further step of sending, by the first device, a next hop resolution protocol query requesting the second tag and the medium access control address of the second device.

9. The method of claim 8 wherein at least one routing device is disposed between the first and second devices, and including the further step of receiving the query in a routing device and, if the routing device is unable to answer the query, forwarding the query.

10. The method of claim 8 wherein at least one routing device is disposed between the first and second devices, and including the further step of receiving the query in a routing device and responding with a message including at least the second tag.

11. The method of claim 8 including the further step of receiving the query in the second device and responding with a message including at least the second tag.

12. The method of claim 8 including the further step of sending the query periodically.

13. The method of claim 12 including the further step of periodically sending the query at intervals of from 30 seconds to 30 minutes.

14. The method of claim 8 wherein at least one routing device is disposed between the first and second devices, and including the further step of receiving the query in a routing device, determining whether the first device represents a security risk and, if the first device represents a security risk, denying the query.

15. The method of claim 1 wherein at least one routing device is disposed between the first device and the second device, and including the further step of, when the first device is unable to transmit the data unit directly to the second virtual local area network, employing the routing device nearest the first device as a proxy by transmitting the data unit from the first device to the nearest routing device, and from the nearest routing device directly to the second virtual local area network.

16. The method of claim 1 wherein at least one routing device is disposed between the first device and the second device, and including the further step of, when the second device is unable to receive the data unit directly, employing the routing device nearest the second device as a proxy by transmitting the data unit from the first device to the routing device nearest the second device, and from the routing device directly to the second virtual local area network.

17. The method of claim 1 wherein at least first and second routing devices are disposed between, and nearest to, the first device and the second device, respectively, and including the further step of, when the first and second devices are unable to transmit and receive the data unit directly, employing the first and second routing devices as proxies by transmitting the data unit from the first device to the first routing device, from the first routing device to the second routing device, and from the second routing device directly to the second virtual local area network.

18. The method of claim 1 wherein the first and second devices are disposed in different networks, the first device being disposed in a network having a plurality of routers which function as gateways to external networks, and including the further step of employing the gateway routing device most directly interposed between the first and second devices by transmitting the data unit from the first device directly to the most directly interposed gateway routing device.

19. A method of transmitting a unit of data within a local area network from a first device in a first virtual local area network to a second device in a second virtual local area network, where the first virtual local area network is identified by a first tag and the second virtual local area network is identified by a second tag, the method comprising the steps of:

obtaining connectivity information indicating a location of the second device;

determining, responsive to the obtained connectivity information indicating the location of the second device, that the first device and the second device are each included within a common local area network;

determining, responsive to determining that the first device and the second device are each included within the common local area network, that the second device is located on the second, different virtual local area network;

obtaining the second tag in the first device, responsive to determining that the second device is located on the second, different virtual local area network;

associating the second tag with the unit of data in the first device;

transmitting the unit of data within the common local area network;

recognizing the unit of data as being destined for the second, different virtual local area network by examining the second tag;

receiving the unit of data in each device in the second, different virtual local area network; and identifying in the second device that the unit of data is addressed to the second device.

20. The method of claim 19 including the further step of obtaining the second tag from the second device.

21. The method of claim 19 including the further step of obtaining the second tag from at least one routing device.

22. The method of claim 19 including the further step of distributing a description of local area network topology to an intermediate switching device.

23. The method of claim 22 wherein the distributing step includes the further step of employing a virtual local area network information protocol.

24. The method of claim 22 wherein the distributing step includes the further step of registering the VLAN tags of each virtual local area network within the local area network.

25. The method of claim 19 including the further step of determining the second tag by employing a next hop resolution protocol.

26. The method of claim 25 including the further step of sending, by the first device, a next hop resolution protocol query requesting the second tag and the medium access control address of the second device.

27. The method of claim 26 including the further step of receiving the query in a routing device and, if the routing device is unable to answer the query, forwarding the query.

28. The method of claim 26 including the further step of receiving the query in a routing device and responding with a message including at least the second tag.

29. The method of claim 26 including the further step of receiving the query in the second device and responding with a message including at least the second tag.

30. The method of claim 26 including the further step of sending the query periodically.

31. The method of claim 30 including the further step of periodically sending the query at intervals of from 30 seconds to 30 minutes.

32. The method of claim 26 including the further step of receiving the query in a routing device, determining whether the first device represents a security risk and, if the first device represents a security risk, denying the query.

33. The method of claim 19 including the further step of, when the first device is unable to transmit the data unit directly to the second virtual local area network, employing a routing device nearest the first device as a proxy by transmitting the data unit from the first device to the nearest routing device, and from the nearest routing device directly to the second virtual local area network.

34. The method of claim 19 including the further step of, when the second device is unable to receive the data unit directly, employing a routing device nearest the second device as a proxy by transmitting the data unit from the first device to the routing device nearest the second device, and from the routing device directly to the second virtual local area network.

35. The method of claim 19 wherein at least first and second routing devices are disposed between, and nearest to, the first device and the second device, respectively, and including the further step of, when the first and second devices are unable to transmit and receive the data unit directly, employing the first and second routing devices as proxies by transmitting the data unit from the first device to the first routing device, from the first routing device to the second routing device, and from the second routing device directly to the second virtual local area network.

* * * * *